United States Patent
Washizuka

(10) Patent No.: US 9,221,305 B2
(45) Date of Patent: Dec. 29, 2015

(54) HEAVY DUTY PNEUMATIC TIRE

(71) Applicant: SUMITOMO RUBBER INDUSTRIES, LTD., Kobe-shi, Hyogo (JP)

(72) Inventor: Masakazu Washizuka, Kobe (JP)

(73) Assignee: SUMITOMO RUBBER INDUSTRIES, LTD., Kobe-shi (JP)

(*) Notice: Subject to any disclaimer, the term of this patent is extended or adjusted under 35 U.S.C. 154(b) by 222 days.

(21) Appl. No.: 13/731,818

(22) Filed: Dec. 31, 2012

(65) Prior Publication Data
US 2013/0180638 A1 Jul. 18, 2013

(30) Foreign Application Priority Data
Jan. 16, 2012 (JP) ................. 2012-006431

(51) Int. Cl.
*B60C 11/03* (2006.01)
*B60C 11/11* (2006.01)
*B60C 11/13* (2006.01)

(52) U.S. Cl.
CPC ......... *B60C 11/0309* (2013.04); *B60C 11/0311* (2013.04); *B60C 11/0306* (2013.04); *B60C 11/1353* (2013.04); *B60C 2011/036* (2013.04); *B60C 2011/0341* (2013.04); *B60C 2011/0344* (2013.04); *B60C 2011/0346* (2013.04); *B60C 2011/0353* (2013.04); *B60C 2011/0355* (2013.04); *B60C 2011/0358* (2013.04); *B60C 2011/0365* (2013.04);*B60C 2011/0367* (2013.04); *B60C 2011/0372* (2013.04); *B60C 2011/1361* (2013.04); *B60C 2200/06* (2013.04)

(58) Field of Classification Search
CPC ................. B60C 2011/0358; B60C 2011/036; B60C 2011/0365; B60C 2011/0374; B60C 11/11; B60C 11/0306; B60C 2200/04; B60C 2200/06

USPC ............... 152/209.18, 902, 900, 209.1, 209.8
See application file for complete search history.

(56) References Cited

U.S. PATENT DOCUMENTS

| | | | | |
|---|---|---|---|---|
| 3,856,067 A | * | 12/1974 | Gorter | 152/209.15 |
| 5,417,269 A | * | 5/1995 | Kinoshita et al. | 152/209.19 |
| 6,050,313 A | * | 4/2000 | Tsuda | 152/209.18 |

FOREIGN PATENT DOCUMENTS

| | | | | |
|---|---|---|---|---|
| JP | 2005-289122 A | | 10/2005 | |
| JP | 2009161112 A | * | 7/2009 | ............. B60C 11/04 |

OTHER PUBLICATIONS

Machine Translation: JP2009-161112A; Fujioka, Takashi; (No date).*

*Primary Examiner* — Steven D. Maki
*Assistant Examiner* — Kendra Ly
(74) *Attorney, Agent, or Firm* — Birch Stewart Kolasch & Birch, LLP

(57) ABSTRACT

Heavy duty pneumatic tire with a tread portion having a zigzag crown main groove and a pair of zigzag shoulder main grooves forming two crown land portions between the crown main groove and two shoulder main grooves. The crown land portion is divided by crown lateral grooves into circumferentially arranged crown blocks. The crown lateral grooves in each crown land portion extend from alternate axially inside zigzag vertices of the shoulder main groove to zigzag vertices of the crown main groove, while inclining with respect to the tire circumferential direction. The crown block has a crown auxiliary groove narrower in width than the crown main groove and extending to one of the zigzag vertices of the crown main groove to which none of the crown lateral grooves are connected, from one of the inside zigzag vertices of the shoulder main groove, while inclining with respect to the tire axial direction.

7 Claims, 5 Drawing Sheets

HEAVY DUTY PNEUMATIC TIRE

BACKGROUND OF THE INVENTION

The present invention relates to a heavy duty pneumatic tire, more particularly to a tread pattern including blocks capable of improving the wet traction without sacrificing the chipping resistance and uneven wear resistance of the blocks.

In a heavy duty pneumatic tire provided in the tread portion with blocks circumferentially arranged in one or more rows, it is effectual for improving the wet traction to increase the number of the blocks in a row. However, if the number of blocks is increased, since the blocks are decreased in the circumferential dimension and circumferential rigidity, chipping off and uneven wear of the blocks become liable to occur.

SUMMARY OF THE INVENTION

It is therefore, an object of the present invention to provide a heavy duty pneumatic tire in which the traction performance on wet roads as well as the chipping resistance and uneven wear resistance of blocks are satisfied.

According to the present invention, a heavy duty pneumatic tire comprises a tread portion provided with a circumferentially continuous crown main groove extending zigzag along the tire equator and a circumferentially continuous shoulder main groove extending zigzag and disposed on each side of the crown main groove so that a pair of crown land portions are formed between the crown main groove and the shoulder main grooves, and crown lateral grooves disposed in each of the crown land portions and extending between the crown main groove and the shoulder main groove so that the crown land portion is divided into circumferentially arranged crown blocks, wherein the crown lateral grooves in each of the crown land portions extend from alternate axially inside zigzag vertices of the shoulder main groove to zigzag vertices of the crown main groove, while inclining with respect to the tire circumferential direction, the crown blocks are each provided with a crown auxiliary groove being narrower in width than the crown main groove and extending to one of the zigzag vertices of the crown main groove to which none of the crown lateral grooves are connected, from one of the inside zigzag vertices of the shoulder main groove, while inclining with respect to the tire axial direction.

Therefore, the crown block becomes longer in the tire circumferential direction than in the axial direction, and the crown auxiliary grooves are narrower in width than the crown lateral grooves. Thus, the circumferential rigidity of the blocks is effectively increased, and thereby, the block chipping resistance and uneven wear resistance can be improved.

The heavy duty pneumatic tire according to the present invention may be further provided with the following features:

(1) the number of the above-mentioned circumferentially arranged crown blocks is in a range of from 23 to 33;
(2) the crown auxiliary groove has a cranked configuration and is composed of a central portion and a pair of lateral portions extending from respective ends of the central portion to the shoulder main groove and the crown main groove, respectively, the lateral portions are inclined at an angle of from 10 to 30 degrees with respect to the tire axial direction, and the central portion is inclined at an angle of from 90 to 140 degrees with respect to the lateral portions; and
(3) a circumferential length of the crown auxiliary groove is more than a circumferential length of the crown lateral groove.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The tread edges $2t$ are the axial outermost edges of the ground contacting patch of the tire (camber angle=0) in the normally inflated loaded condition.

The tread width TW is the axial distance between the tread edges measured in the normally inflated unloaded condition of the tire.

DESCRIPTION OF THE PREFERRED EMBODIMENTS

Figure 1:
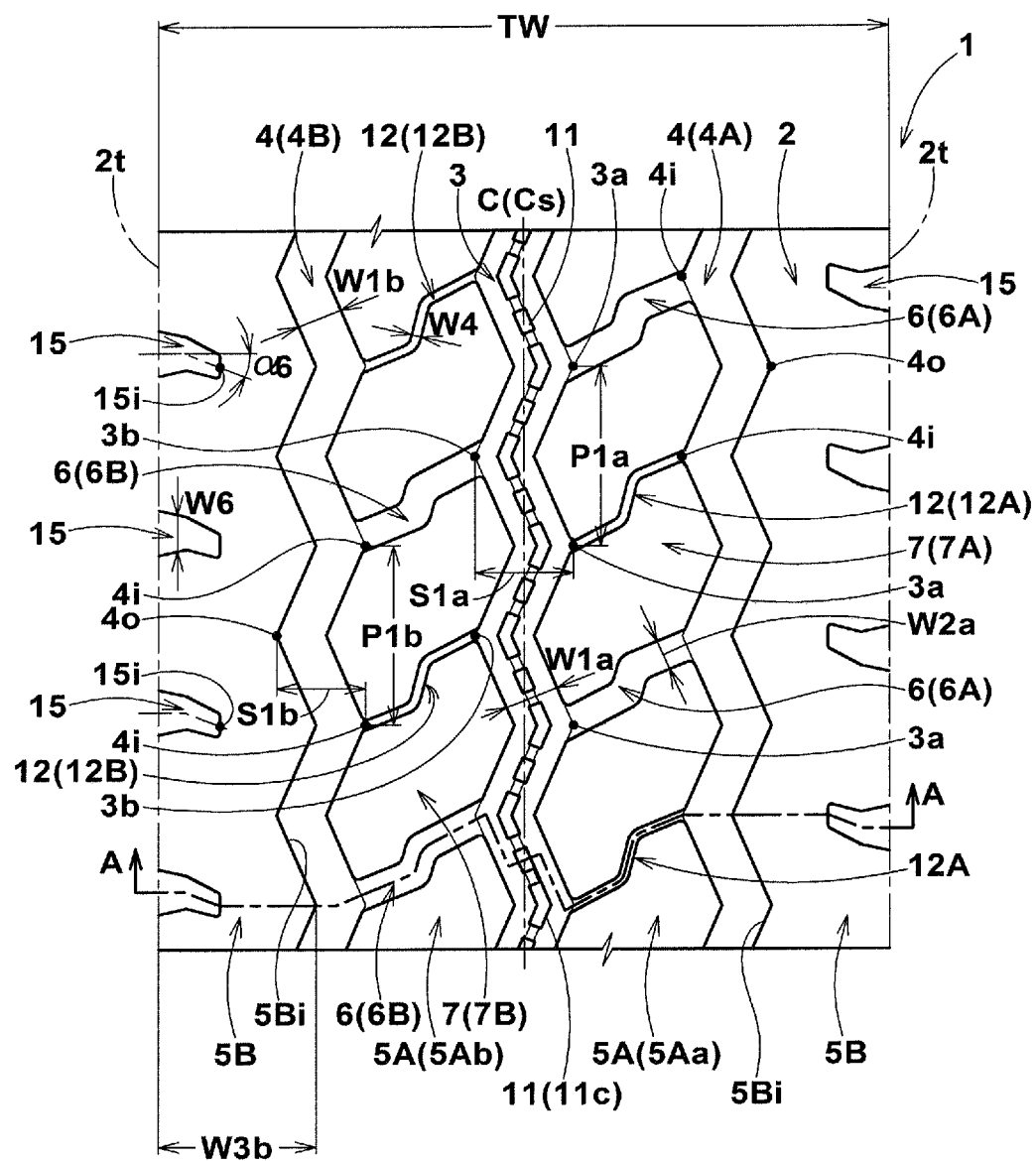
FIG. 1 is a partial plan view of a heavy duty pneumatic tire as an embodiment of the present invention showing a tread pattern.

Embodiments of the present invention will now be described in detail in conjunction with the accompanying drawings.

In the drawings, heavy duty pneumatic tire 1 as an embodiment of the present invention is a truck/bus radial tire.

As usual, the tire 1 comprises a tread portion 2, a pair of axially spaced bead portions each with a bead core therein, a pair of sidewall portions extending between the tread edges and the bead portions, a carcass extending between the bead portions, and a tread reinforcing belt disposed radially outside the carcass in the tread portion.

The tread portion 2 is provided with circumferentially continuously extending main grooves which are a crown main groove 3 extending zigzag along the tire equator Cs, and a shoulder main groove 4 (4A, 4B) extending zigzag and disposed on each side of the crown main groove 3. Thereby, the tread portion 2 is axially divided into a pair of crown land portions 5A (5Aa and 5Ab) between the crown main groove 3 and shoulder main grooves 4 and a pair of shoulder land portions 5B between the shoulder main grooves 4 and the tread edges 2t.

The crown main groove 3 has zigzag vertices 3a on one side of the tire equator in the tire axial direction, and zigzag vertices 3b on the other side of the tire equator.

Such crown main groove 3 functions to lead the water existing between the tread portion 2 and road surface toward the circumferential direction and also increase the axial component of the edges in order to improve the wet traction.

In order to effectively derive this advantageous effect, the crown main groove 3 preferably has a width W1a of about 5 to 10% of the tread width TW, and a depth D1a of about 5 to 10% of the tread width TW.

The zigzag pitches or the circumferential distances P1a between the zigzag vertices 3a (or 3b) on one side are preferably about 24 to 29% of the tread width TW.

The axial distances S1a between the zigzag vertices 3a and the zigzag vertices 3b are preferably about 10 to 15% of the tread width TW.

Figure 2:
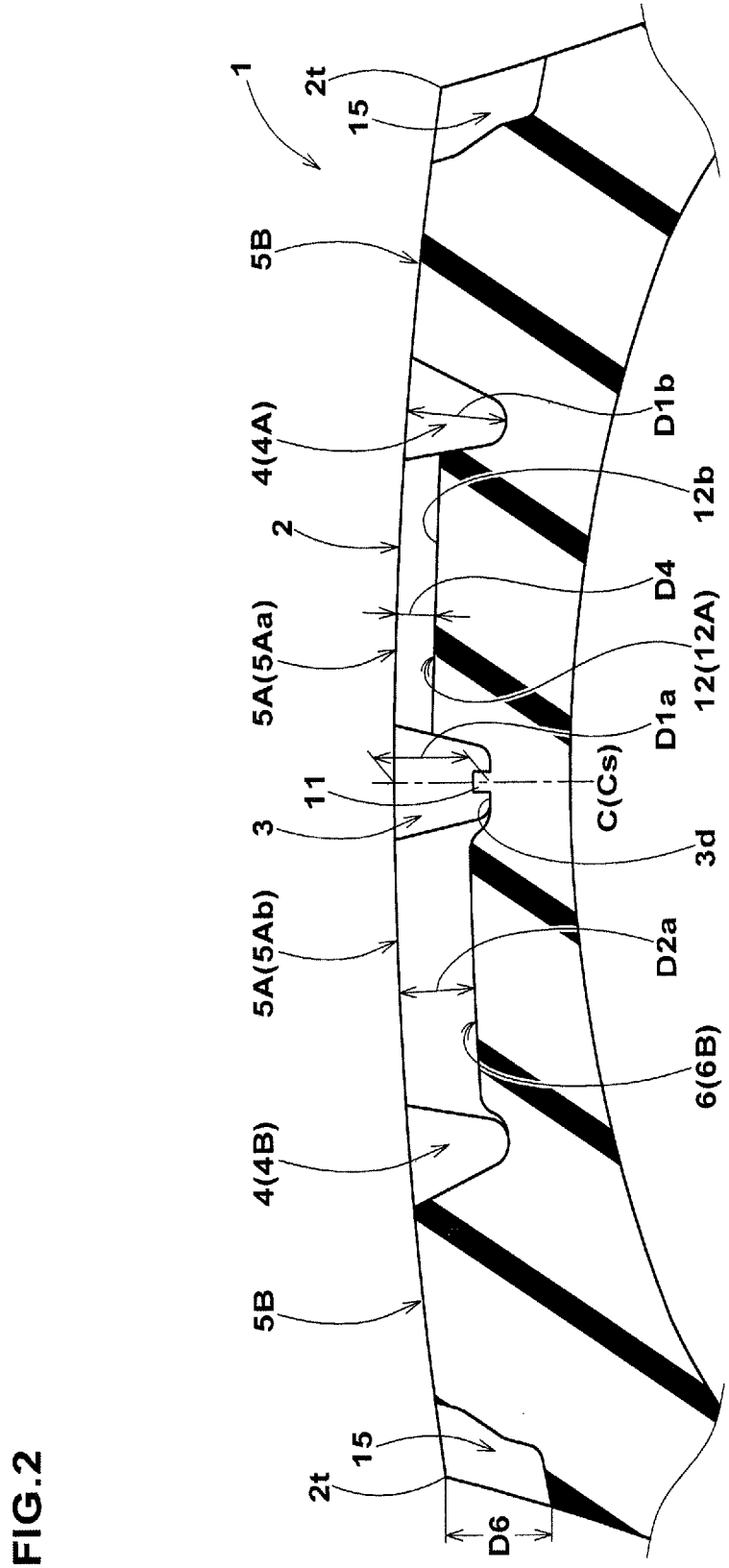
FIG. 2 is a cross sectional view of the tread portion thereof taken along line A-A of FIG. 1.

In this embodiment, in order to expedite self-discharge of small objects such as stone entrapped in the crown main groove 3, a platform 11 is provided in the crown main groove 3 as shown in FIG. 1 and FIG. 2. The platform 11 protrudes from the groove bottom 3d and in this example it is formed discontinuously along the widthwise center line 3L of the crown main groove 3. AS a result, the platform 11 is made up of V-shaped bent pieces 11c positioned at the zigzag vertices 3a and 3b and substantially rectangular pieces longer in the groove's longitudinal direction positioned between the zigzag vertices 3a and 3b.

The shoulder main groove 4 has axially inside zigzag vertices 4i toward the axially inside and axially outside zigzag vertices 4o toward the axially outside. Such shoulder main grooves 4 function to improve the wet traction.

The shoulder main groove 4 preferably has a width W1b of about 3 to 7% of the tread width TW, and a depth D1b of about 6 to 12% of the tread width TW.

The zigzag pitches or the circumferential distances P1b between the zigzag vertices 4i (or 4o) are preferably about 24 to 29% of the tread width TW.

The zigzag groove width or the axial distances S1b between the axially inside zigzag vertices 4i and the axially outside zigzag vertices 4o are preferably about 10 to 15% of the tread width TW.

In this embodiment, the zigzag pitches P1a of the crown main groove 3 are substantially same as the zigzag pitches P1b of the shoulder main groove 4.

Each of the crown land portions 5Aa and 5Ab is divided into a row of circumferentially arranged crown blocks 7 (7A, 7B) by crown lateral grooves 6 (6A, 6B) extending from the crown main groove 3 to the shoulder main groove 4.

The crown lateral grooves 6A in the crown land portion 5Aa extend from alternate inside zigzag vertices 4i of the shoulder main groove 4A to alternate zigzag vertices 3a of the crown main groove 3. The crown lateral grooves 6B in the crown land portion 5Ab extend from alternate inside zigzag vertices 4i of the shoulder main groove 4B to alternate zigzag vertices 3b of the crown main groove 3.

All of the crown lateral grooves 6A and 6B are inclined with respect to the tire axial direction toward the same direction.

Preferably, each of the crown lateral grooves 6A and 6B has a width W2a of about 3 to 7% of the tread width TW, and a depth D2a of about 3 to 8% of the tread width TW.

Such crown lateral grooves 6A and 6B function to lead the water existing between the crown land portions and road surface toward the axial direction and also increase the axial component of the edges in order to improve the wet traction.

Since the crown lateral grooves 6A and 6B connect between the zigzag vertices 4i and the zigzag vertices 3a and 3b, the water flowing in the main grooves 3 and 4 is effectively led into the crown lateral grooves and drained as the tire rotates, therefore, the wet traction can be effectively improved.

Figure 3:
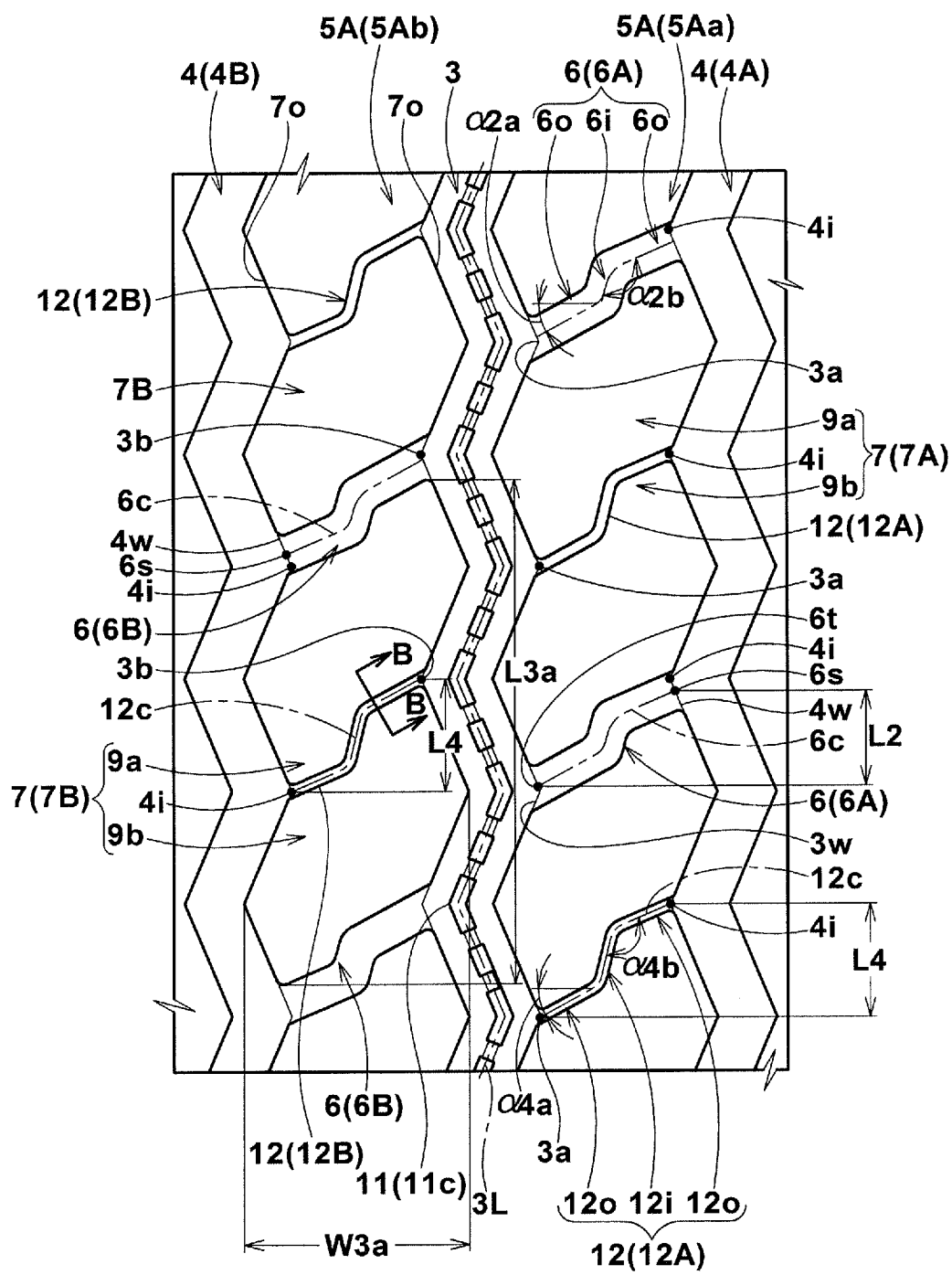
FIG. 3 is an enlarged partial plan view showing a tread crown portion thereof.

Each of the crown lateral grooves 6A and 6B in this embodiment has a cranked configuration as shown in FIG. 3, and is made up of a central portion 6i and a pair of lateral portions 6o extending parallel with each other from the respective ends of the central portion 6i to the main grooves 3 and 4 in order to increase the edges of the crown block 7. For that purpose, it is preferred that, in each of the crown lateral grooves 6A and 6B, the lateral portions 6o are inclined at an angle α2a of from 10 to 30 degrees with respect to the tire axial direction, and the central portion 6i is inclined at an angle α2b of from 90 to 140 degrees with respect to the lateral portions 6o.

The intersecting point 6s of the widthwise center line 6c of each of the crown lateral grooves 6 with the groove wall 4w of the shoulder main groove 4 is positioned axially outward of the inside zigzag vertices 4i of the shoulder main groove in order to expedite the drainage of water from the crown lateral grooves 6 to the shoulder main grooves 4.

Each of the crown blocks 7 has a circumferentially long configuration as a result of that the crown lateral grooves 6 are formed alternately of the inside zigzag vertices 4i. The crown block 7 has zigzag side edges 7o respectively abutting on the main grooves 3 and 4.

Such crown blocks 7 are increased in the circumferential rigidity and edges, and thereby the wet traction, and the chipping resistance and uneven wear resistance of the blocks can be improved.

It is preferred that the crown block 7 has a circumferential length L3a of about 50 to 70% of the tread width TW, and an axial width W3a of about 20 to 30% of the tread width TW. In order to effectively derive the above-mentioned advantageous effect, the number of the crown block 7 in a row is preferably not less than 23, more preferably not less than 25, but not more than 33, more preferably not more than 30.

If the number exceeds 33, it becomes difficult to obtain the above-mentioned advantageous effects. If the number is less than 23, since the axial component of the edges decreases, there is a possibility that the wet traction is deteriorated.

Each of the crown blocks 7 is provided with a single crown auxiliary groove 12 (12A, 12B) extending from the crown main groove 3 to the shoulder main groove 4 so as to subdivide the crown block into two crown block pieces 9a and 9b.

As shown in FIG. 1, the crown auxiliary groove 12A in the crown block 7A extends between one of the inside zigzag vertices 4i of the shoulder main groove 4A and one of the zigzag vertices 3a of the crown main groove 3. The crown auxiliary groove 12B in the crown block 7B extends between one of the inside zigzag vertices 4i of the shoulder main groove 4B and one of the zigzag vertices 3b of the crown main groove 3.

The crown auxiliary grooves 12A and 12B are inclined with respect to the tire axial direction.

The crown auxiliary grooves 12A and 12B have a width W4 smaller than those of the crown lateral grooves 6A and 6B.

Such crown auxiliary grooves 12A and 12B function to remove the water existing between the crown blocks and the road surface and exert edge effect to improve the wet traction.

Since the crown auxiliary groove is narrow in width, movements in the tire circumferential direction of the adjacent crown block pieces 9a and 9b are restricted and as a result, the crown block 7 maintains higher apparent rigidity, therefore, the chipping resistance and uneven wear resistance of the crown blocks can be maintained.

In order to effectively bring out such advantageous effects, preferably each of the crown auxiliary grooves 12A and 12B has a width W4 of not less than 25%, more preferably not less than 28%, but not more than 40%, more preferably not more than 37% of the width W2a of the crown lateral groove 6. If the width W4 is more than 40%, there is a possibility that the block chipping resistance and uneven wear resistance are deteriorated. If the width W4 is less than 25%, there is a possibility that the wet traction can not be sufficiently improved.

Preferably, each of the crown auxiliary grooves 12 has a depth D4 of not less than 33%, more preferably not less than 38%, but not more than 50%, more preferably not more than 45% of the depth D1a of the crown main groove 3.

Each of the crown auxiliary grooves 12 has, as shown in FIG. 3, a cranked configuration and is made up of a central portion 12i and a pair of lateral portions 12o extending from respective ends of the central portion 12i to the main grooves 3 and 4, respectively.

The lateral portions 12o and 12o are inclined at an angle α4a of from 10 to 30 degrees with respect to the tire axial direction. The central portion 12i is inclined at an angle α4b of from 90 to 140 degrees with respect to the lateral portions 12o. Therefore, the crown auxiliary grooves 12A and 12B further increase the edges of the crown block to further improve the wet traction.

If the angle α4b becomes larger than 140 degrees, it becomes difficult to obtain the above-mentioned advantageous effects. If the angle α4b is less than 90 degrees, the corners formed between the central portion 12i and the lateral portions 12o,12o are decreased in the rigidity, and there is a possibility that the block chipping resistance, uneven wear resistance, and noise performance are deteriorated.

From this standpoint, the angle α4b is more preferably not more than 135 degrees, and not less than 125 degrees.

It is preferable that the circumferential length L4 of the crown auxiliary groove 12 is more than the circumferential length L2 of the crown lateral groove 6. More preferably, the length L4 of the crown auxiliary groove 12 is set in a range of from 1.05 to 1.30 times the length L2 of the crown lateral groove 6. Thereby, the crown auxiliary grooves 12A and 12B further increase the edges of the crown blocks 7A and 7B, and the crown block pieces 9a and 9b can support each other. As a result, the wet traction, block chipping resistance and uneven wear resistance can be improved.

Here, the length L4 of the crown auxiliary groove 12A, 12B is defined by a circumferential distance between an inside zigzag vertex 4i and a zigzag vertex 3a/3b. The length L2 of the crown lateral groove 6A, 6B is defined by a circumferential distance between an intersecting point 6t of the widthwise center line 6c of the crown lateral groove with the groove wall 3w of the crown main groove 3A, 3B and an intersecting point 6s of the widthwise center line 6c with the groove wall 4w of the shoulder main groove 4.

If the length L4 is less than 1.05 times the length L2, it becomes difficult to obtain the above-mentioned advantageous effects. If the length L4 is more than 1.3 times the length L2, the rigidity of the crown block 7A, 7B decreases and there is a possibility that the block chipping resistance and uneven wear resistance are deteriorated.

From this standpoint, the length L4 of the crown auxiliary groove 12 is more preferably not less than 1.1 times and not more than 1.25 times the length L2 of the crown lateral groove 6.

In each of the crown land portions 5A, the crown lateral grooves 6 and the crown auxiliary grooves 12 are arranged alternately in the tire circumferential direction, and inclined in the substantially same directions in almost parallel with each other.

Figure 4:
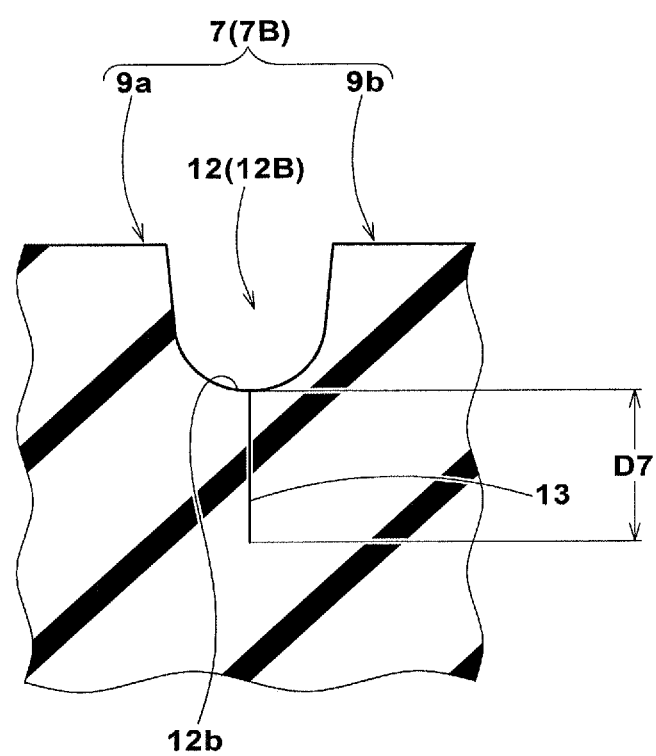
FIG. 4 is a cross sectional view taken along line B-B of FIG. 3.

In this embodiment, as shown in FIG. 4, the bottom 12b of each of the crown auxiliary grooves 12 is provided with a sipe 13 extending along the widthwise center line 12c thereof. Therefore, even if the crown auxiliary grooves 12A and 12B disappear due to tread wear, such sipes 13 can provide edges and the wet traction performance can be maintained. Further, the crown block pieces 9a and 9b can support each other, and the improved chipping resistance and uneven wear resistance can be maintained. In order that such advantageous functions can be maintained from the initial stage of the tread wear life to the final stage, the depth D7 of the sipe 13 is preferably set in a range of from 50 to 67% of the depth D1a of the crown main groove 3.

As shown in FIG. 1, the shoulder land portion 5B is provided with shoulder lateral grooves 15 extending from the tread edge 2t to their axially inner ends 15i which are positioned at a certain distance axially outward of the shoulder main groove 4, whereby the shoulder land portion 5B is formed as a rib continuous in the tire circumferential direction. In other words, there is no groove extending across the entire width of the shoulder land portion 5B.

The width W3b of the shoulder land portion 5B is preferably about 18 to 23% of the tread width TW.

Such shoulder land portion 5B has higher rigidity in the tire circumferential direction and axial direction in comparison with a row of blocks, therefore, the straight running stability and cornering stability can be improved.

The axial inner edge 5Bi of the shoulder land portion 5B is zigzag, therefore, the axial component of the edges is increased and the wet traction is further improved.

The angle α6 of the shoulder lateral groove 15 with respect to the tire axial direction is gradually decreased from the axially inner end 15i to the tread edge 2t.

Such shoulder lateral grooves 15 function to lead the water existing between the shoulder land portion 5B and the road surface toward the axially outside, and lessen the decrease in the rigidity of the shoulder land portion 5B, therefore, the wet traction and uneven wear can be improved.

The shoulder lateral groove 15 preferably has a depth D6 of about 5 to 10% of the tread width TW, and a width W6 of about 3 to 7% of the tread width TW. In an axially outer part 15b of the shoulder lateral groove 15, the width W6 is gradually increased toward the axially outside to expedite the drainage toward the tread edge 2t.

As in the foregoing, a particularly preferred embodiment of the present invention is described in detail. However, the present invention is not limited to the embodiment illustrated but may be carried out in various modified manners.

Comparison Tests

Figure 5:
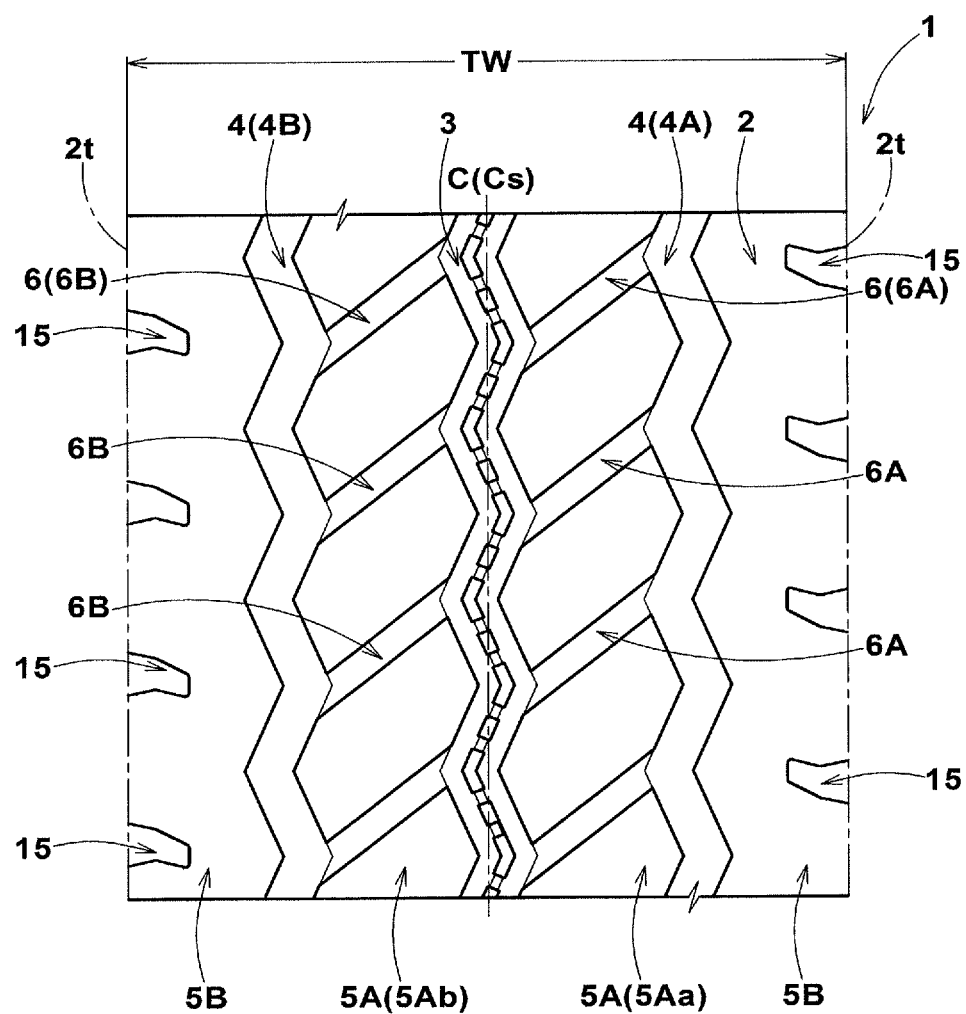
FIG. 5 is a partial plan view of a heavy duty pneumatic tire as a comparative example used in the undermentioned comparison tests.

Test tires of size 11R22.5 (rim size: 22.5×7.50) for truck/bus having the basic tread pattern shown in FIG. 1 and a tread pattern shown in FIG. 5 were experimentally manufactured and tested for the wet traction, and the chipping resistance and uneven wear resistance of the blocks.
Common specifications are as follows:
Tread width TW: 223 mm
Crown main groove:
  width W1$a$: 16.5 mm (7.4% of TW)
  depth D1$a$: 17.5 mm (7.8% of TW)
  zigzag pitch P1$a$: 58.6 mm (26.3% of Tw)
  axial distance S1$a$: 29.4 mm (13.2% of Tw)
Shoulder main grooves:
  width W1$b$: 13.8 mm (6.2% of TW)
  depth D1$b$: 20.6 mm (9.2% of TW)
  zigzag pitch P1$b$: 58.6 mm (26.3% of Tw)
  zigzag groove width S1$b$: 29.4 mm (13.2% of Tw)
Crown lateral grooves:
  width W2$a$: 10.0 mm (4.5% of TW)
  depth D2$a$: 12.5 mm (5.6% of TW)
  lateral portions' angle α2$a$: 20 degrees,
  central portion's angle α2$b$: 70 degrees
  circumferential length L2: 46.2 mm
Crown blocks:
  width W3$a$: 56.9 mm (25.5% of TW)
Crown auxiliary groove:
  lateral portions' angle α4$a$: 20 degrees
<Block Chipping Resistance Test>
The test tires were heat aged for ten days at a temperature of 70 degrees C. Then, using a tire test drum (diameter 1.7 m) provided with protrusions of 2.0 mm height, the test tire was run for 100 hours at a speed of 40 km/h under a tire load of 13.36 kN and a tire pressure of 800 kPa, and thereafter, the number of chipped off blocks was counted. The results are indicated in Table 1 by an index based on Embodiment tire Ex. 1 being 100, wherein the larger the value, the better the resistance.
<Wet Traction Performance Test>
A test vehicle (8.5 ton 2-D truck) provided on all wheels with test tires, was run along a 100 meter radius circle on an asphalt road partially provided with a 1 mm depth 20 m long water pool, and the lateral acceleration (lateral G) during running in the water pool was measured, gradually increasing the speed entering into the water pool. The maximum lateral acceleration (lateral G) and the speed at which the maximum lateral acceleration was occurred were measured in a speed range of from 70 to 90 km/h. The results are indicated in Table 1 by an index based on comparative example tire Ref. 1 being 100, wherein the larger is better.
<Uneven Wear Resistance Test>
Using the above-mentioned truck, after running on public roads for 10000 km, the amount of uneven wear between the crown block pieces was measured. The results are indicated in Table 1 by an index based on Embodiment tire Ex. 1 being 100, wherein the larger the value, the better the resistance.

As the results of the tests, it has been confirmed that Embodiment tires can be improved in the wet traction, block chipping resistance and uneven wear resistance at high levels.

TABLE 1

| Tire | Ref. 1 | Ex. 1 | Ex. 2 | Ex. 3 | Ex. 4 | Ex. 5 | Ex. 6 | Ex. 7 |
|---|---|---|---|---|---|---|---|---|
| tread pattern (FIG. No.) | 5 | 1 | 1 | 1 | 1 | 2 | 1 | 1 |
| number of crown blocks | 50 | 20 | 23 | 28 | 33 | 40 | 28 | 28 |
| crown auxiliary groove | | | | | | | | |
| angle α4$b$ (deg.) | — | 130 | 130 | 130 | 130 | 130 | 80 | 90 |
| width W4 (mm) | — | 3.0 | 3.0 | 3.0 | 3.0 | 3.0 | 3.0 | 3.0 |
| W4/W2$a$ (%) | — | 30 | 30 | 30 | 30 | 30 | 30 | 30 |
| depth D4 (mm) | — | 8.2 | 8.2 | 8.2 | 8.2 | 8.2 | 8.2 | 8.2 |
| D4/D1$a$ (%) | — | 47 | 47 | 47 | 47 | 47 | 47 | 47 |
| length L4 (mm) | — | 53 | 53 | 53 | 53 | 53 | 53 | 53 |
| L4/L2 | — | 1.15 | 1.15 | 1.15 | 1.15 | 1.15 | 1.15 | 1.15 |
| with sipe? | — | yes | yes | yes | yes | yes | yes | yes |
| chipping resistance | 60 | 100 | 110 | 110 | 105 | 80 | 80 | 105 |
| uneven wear resistance | 60 | 100 | 110 | 110 | 105 | 80 | 70 | 100 |
| wet traction | 100 | 80 | 95 | 100 | 100 | 100 | 100 | 100 |

| Tire | Ex. 8 | Ex. 9 | Ex. 10 | Ex. 11 | Ex. 12 | Ex. 13 | Ex. 14 | Ex. 15 |
|---|---|---|---|---|---|---|---|---|
| tread pattern (FIG. No.) | 1 | 1 | 1 | 1 | 1 | 1 | 1 | 1 |
| number of crown blocks | 28 | 28 | 28 | 28 | 28 | 28 | 28 | 28 |
| crown auxiliary groove | | | | | | | | |
| angle α4$b$ (deg.) | 140 | 150 | 130 | 130 | 130 | 130 | 130 | 130 |
| width W4 (mm) | 3.0 | 3.0 | 2.0 | 2.6 | 3.9 | 4.5 | 3.0 | 3.0 |
| W4/W2$a$ (%) | 30 | 30 | 20 | 26 | 39 | 45 | 30 | 30 |
| depth D4 (mm) | 8.2 | 8.2 | 8.2 | 8.2 | 8.2 | 8.2 | 6.0 | 6.7 |
| D4/D1$a$ (%) | 47 | 47 | 47 | 47 | 47 | 47 | 34 | 38 |
| length L4 (mm) | 53 | 53 | 53 | 53 | 53 | 53 | 53 | 53 |
| L4/L2 | 1.15 | 1.15 | 1.15 | 1.15 | 1.15 | 1.15 | 1.15 | 1.15 |
| with sipe? | yes | yes | yes | yes | yes | yes | yes | yes |
| chipping resistance | 105 | 95 | 112 | 112 | 100 | 90 | 112 | 112 |
| uneven wear resistance | 105 | 80 | 112 | 112 | 95 | 85 | 112 | 112 |
| wet traction | 100 | 100 | 70 | 80 | 100 | 100 | 70 | 85 |

| Tire | Ex. 16 | Ex. 17 | Ex. 18 | Ex. 19 | Ex. 20 | Ex. 21 | Ex. 22 |
|---|---|---|---|---|---|---|---|
| tread pattern (FIG. No.) | 1 | 1 | 1 | 1 | 1 | 1 | 1 |
| number of crown blocks | 28 | 28 | 28 | 28 | 28 | 28 | 28 |
| crown auxiliary groove | | | | | | | |
| angle α4$b$ (deg.) | 130 | 130 | 130 | 130 | 130 | 130 | 130 |
| width W4 (mm) | 3.0 | 3.0 | 3.0 | 3.0 | 3.0 | 3.0 | 3.0 |

TABLE 1-continued

| | | | | | | | |
|---|---|---|---|---|---|---|---|
| W4/W2a (%) | 30 | 30 | 30 | 30 | 30 | 30 | 30 |
| depth D4 (mm) | 10.0 | 11.0 | 8.2 | 8.2 | 8.2 | 8.2 | 8.2 |
| D4/D1a (%) | 57 | 63 | 47 | 47 | 47 | 47 | 47 |
| length L4 (mm) | 53 | 53 | 46 | 49 | 60 | 65 | 53 |
| L4/L2 | 1.15 | 1.15 | 1.00 | 1.06 | 1.30 | 1.41 | 1.15 |
| with sipe? | yes | yes | yes | yes | yes | yes | no |
| chipping resistance | 100 | 85 | 90 | 100 | 100 | 90 | 110 |
| uneven wear resistance | 95 | 80 | 90 | 100 | 100 | 90 | 110 |
| wet traction | 100 | 100 | 95 | 95 | 90 | 80 | 70 |

The invention claimed is:

1. A heavy duty pneumatic tire comprising a tread portion provided with only three circumferentially continuous grooves, which are:
   a circumferentially continuous crown main groove extending zigzag along the tire equator and
   a circumferentially continuous shoulder main groove extending zigzag and disposed on each side of the crown main groove
   so that a pair of crown land portions are formed between the crown main groove and the shoulder main grooves, and a pair of shoulder land portions are formed axially outside the shoulder main grooves, respectively,
   wherein
   each of the crown land portions is only provided with wider crown lateral grooves and narrower crown auxiliary grooves,
   each of the shoulder land portions is only provided with shoulder lateral grooves,
   the crown lateral grooves in each of the crown land portions extend between the crown main groove and the shoulder main groove so that the crown land portion is divided into circumferentially arranged crown blocks, wherein
   the crown lateral grooves in each said crown land portion extend from alternate axially inside zigzag vertices of the shoulder main groove to zigzag vertices of the crown main groove, while inclining with respect to the tire circumferential direction,
   each said crown block is provided with one of the crown auxiliary grooves so as to extend to one of the zigzag vertices of the crown main groove to which none of the crown lateral grooves are connected, from one of the inside zigzag vertices of the shoulder main groove, while inclining with respect to the tire axial direction,
   the crown auxiliary grooves are narrower in width than the crown main groove,
   the shoulder lateral grooves in each of the shoulder land portions extend axially inward from a tread edge and terminate within the shoulder land portion,
   the crown lateral grooves each have a substantially constant width,
   the crown auxiliary grooves each have a substantially constant width, and
   a circumferential length of the crown auxiliary groove is more than a circumferential length of the crown lateral groove.

2. The heavy duty pneumatic tire according to claim 1, wherein the number of said circumferentially arranged crown blocks is in a range of from 23 to 33.

3. The heavy duty pneumatic tire according to claim 2, wherein
   each said crown auxiliary groove has a cranked configuration and is composed of a central portion and a pair of lateral portions extending from respective ends of the central portion to the shoulder main groove and the crown main groove, respectively,
   the lateral portions are inclined at an angle of from 10 to 30 degrees with respect to the tire axial direction, and
   the central portion is inclined at an angle of from 90 to 140 degrees with respect to the lateral portions.

4. The heavy duty pneumatic tire according to claim 1, wherein
   each said crown auxiliary groove has a cranked configuration and is composed of a central portion and a pair of lateral portions extending from respective ends of the central portion to the shoulder main groove and the crown main groove, respectively,
   the lateral portions are inclined at an angle of from 10 to 30 degrees with respect to the tire axial direction, and
   the central portion is inclined at an angle of from 90 to 140 degrees with respect to the lateral portions.

5. The heavy duty pneumatic tire according to claim 1, wherein
   the crown main groove has a width w1$a$ of 5% to 10% of a tread width, and
   each said shoulder main groove has a width w1$b$ of 3% to 7% of the tread width.

6. The heavy duty pneumatic tire according to claim 5, wherein
   each of the crown lateral grooves has a width w2$a$ of 3% to 7% of the tread width, and
   each of the crown auxiliary grooves has a width w4 of not less than 25% but not more than 40% of the width w2$a$ of the crown lateral groove.

7. The heavy duty pneumatic tire according to claim 1, wherein the crown main groove is provided with a platform protruding from the groove bottom and formed discontinuously along the widthwise center line of the crown main groove.

* * * * *